(No Model.)
J. MURPHY.
HOSE.
No. 587,679. Patented Aug. 3, 1897.
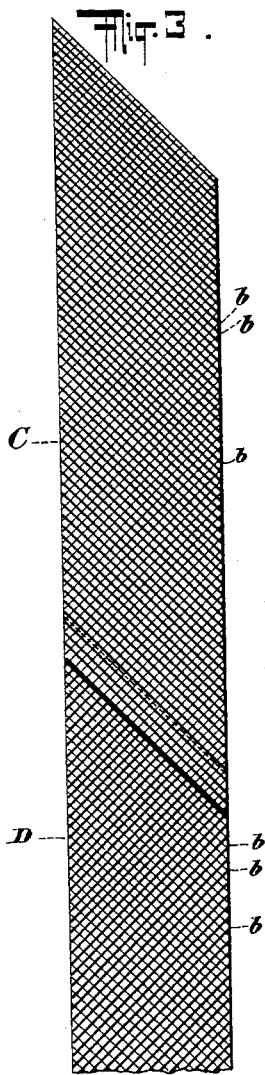
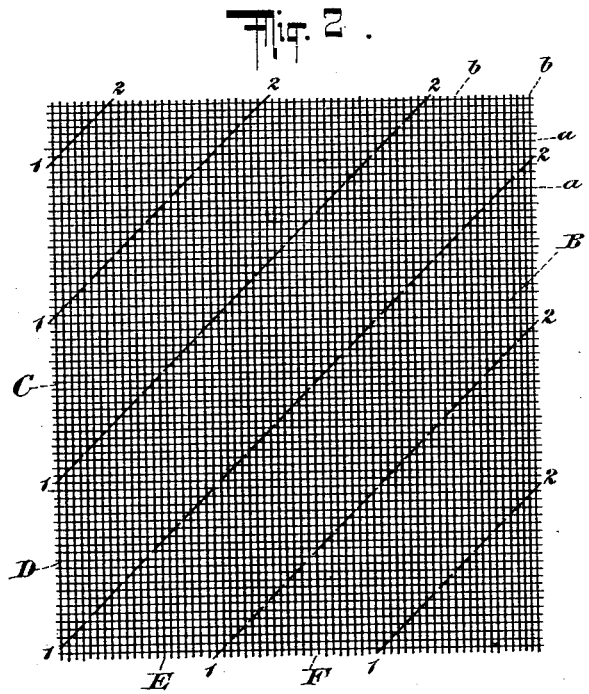
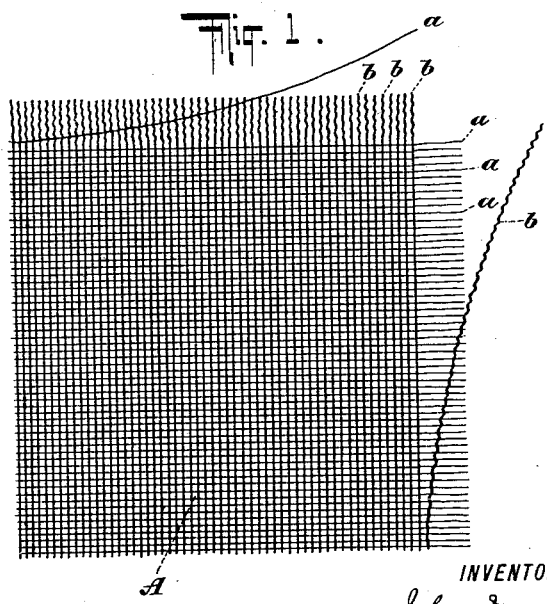
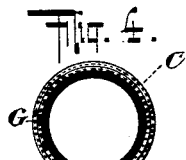
WITNESSES:
Gustave Dieterich.
Geo. A. Moore.
INVENTOR
John Murphy,
BY Briesen Knauth
ATTORNEY.

UNITED STATES PATENT OFFICE.

JOHN MURPHY, OF BROOKLYN, NEW YORK.

HOSE.

SPECIFICATION forming part of Letters Patent No. 587,679, dated August 3, 1897.

Application filed February 11, 1897. Serial No. 622,910. (No model.)

*To all whom it may concern:*

Be it known that I, JOHN MURPHY, a resident of Brooklyn, Kings county, and State of New York, have invented certain new and useful Improvements in Hose, of which the following is a specification.

My invention relates to hose, more particularly fire-hose; and it consists in the construction hereinafter set forth and claimed.

In manufacturing hose it has been customary heretofore to cover the rubber tubing with a textile fabric cut on the bias, surrounding a textile fabric cut straight—that is to say, a fabric whose warp-threads extend in the direction of the length of the hose and whose weft or shuttle threads run transversely to the axis of the hose. Hose thus made is superior to hose covered with straight-cut fabric only, as in hose covered with such straight-cut fabric the warp-threads under strain become elongated, after which, if the hose be bent, they tear, causing the hose to break. I have found, however, that in bias-cut fabric, when the same is subjected to strain—that is to say, when the hose is filled with water under pressure—the crinkled or corrugated warp-threads in their tendency to elongate have the effect of imparting to the entire hose a sort of rotary motion. In other words, the hose will twist and curl because of the fact that the elongated warp-threads under the influence of the weft-threads contacting with them naturally seek to resume their normal position in the fabric. The resulting curling or rotary action of the hose thus constructed is at times most objectionable, being in instances so great as to actually unscrew the couplings. To overcome this defect, the present invention consists in providing hose which has one or more fabric coverings cut on the bias, so that in said covering or coverings the warp-threads run in a certain direction—say from right to left—in one section of the hose, and in adjacent sections of the hose run in the opposite direction—that is to say, from left to right—the tendency of the warp-threads in one set to elongate and rotate the hose in one direction being overcome by the tendency of the warp-threads in the other section to elongate and rotate the hose in the other direction. So, therefore, the rotating tendencies of adjacent sections mutually overcome each other.

I will now proceed to describe in detail a hose embodying my invention and likewise the principles underlying its construction. For this purpose I will have reference to the accompanying drawings, forming part hereof, in which—

Figure 1 represents in diagram a section of fabric such as is used for covering rubber tubes, showing the same raveled out for purposes which will presently appear. Fig. 2 represents a similar section of fabric in an unraveled condition. Fig. 3 represents sections of fabric cut on the bias and united to form the covering of the hose, and Fig. 4 represents a section of hose built up.

Referring particularly to Fig. 1, A is a fabric composed of weft-threads $a$ and warp-threads $b$. It will be observed that the warp-threads are much more corrugated than the weft-threads, and, as before explained, it has heretofore been customary to run these warp-threads longitudinally of the hose or else to cut the fabric on the bias and employ the said bias-cut portions to cover rubber tubing, such bias-cut fabrics being laid in sections with the warp-threads of one section parallel with the warp-threads of another section and the weft-threads of another section. This, as before explained, produces a twisting or rotating tendency in the hose.

Referring to Fig. 2, a section of fabric B is shown having the warp-threads $b$ and the weft-threads $a$, as before, and cut along the lines 1 2 to produce strips C D E F, &c. These strips are secured to each other end for end, the warp-threads $b$ in the section C (see Fig. 3) running diagonally from right to left and the warp-threads $b$ running diagonally from left to right in the adjacent sections D, &c. One or more layers of this fabric covering C D are usually placed around the customary envelop or layer of rubber, either alone or in conjunction with one or more layers of fabric cut straight—as, for instance, as shown in Fig. 4, wherein G is the usual rubber layer or layers surrounded by layers of fabric H I, one of which is the layer constructed according to this invention.

What I claim, and desire to secure by Letters Patent, is—

1. A hose comprising in its structure the usual layer or layers of rubber and a layer or layers of textile fabric cut on the bias, the said layer or layers of textile fabric succeeding each other, section after section, in the length of the hose, and having the warp-threads of one section running at an angle to the warp-threads in the adjacent section so as to obviate a twisting tendency in the hose.

2. A hose comprising in its structure the usual layer or layers of rubber and a layer or layers of textile fabric cut on the bias, the said layer or layers of textile fabric succeeding and united to each other section after section in succession in the length of the hose and having the warp-threads of one section running at an angle to the warp-threads in the adjacent section so as to obviate a twisting tendency in the hose.

JOHN MURPHY.

Witnesses:
T. J. MORRIS,
WM. A. COLLINS.